Patented June 20, 1950

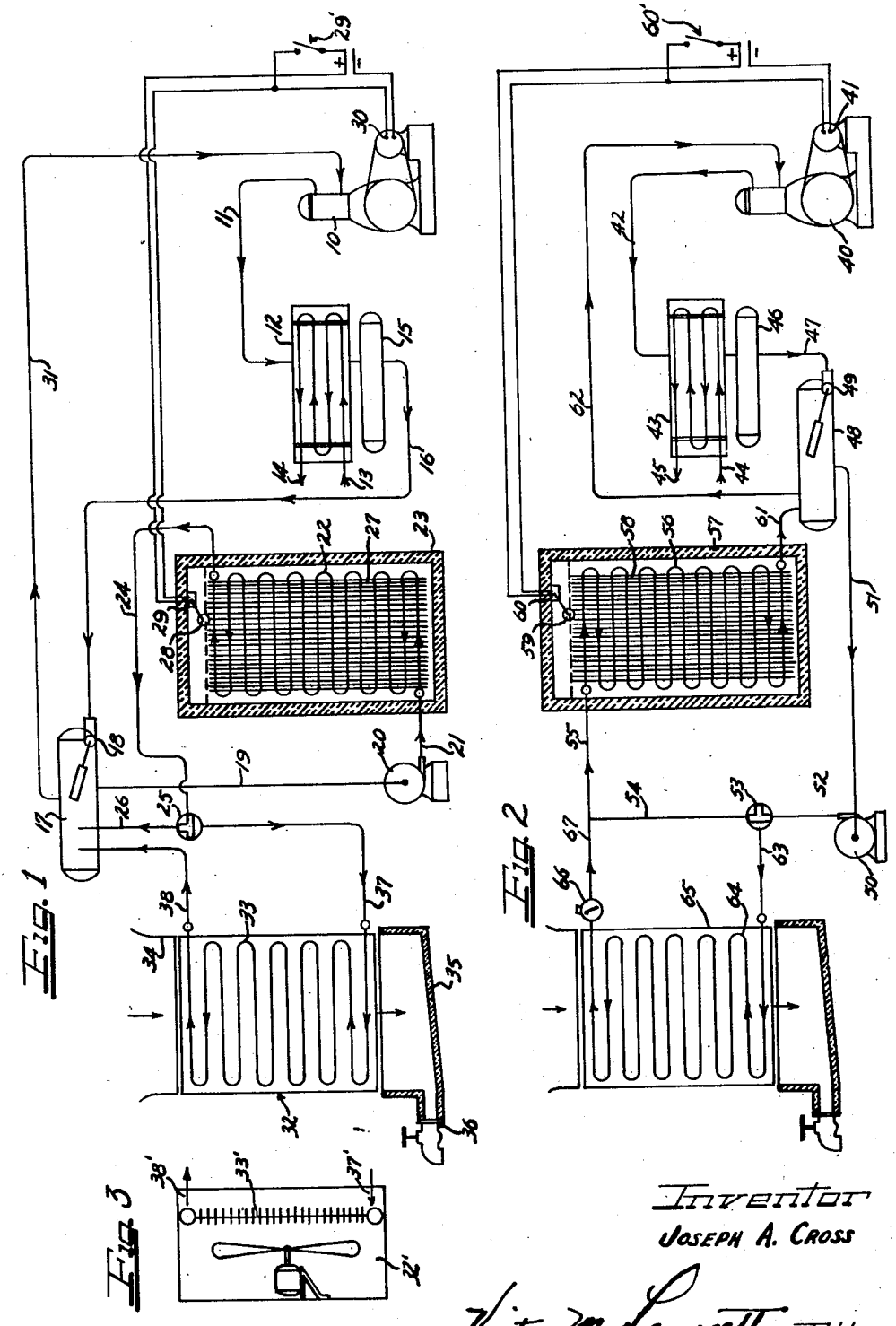

2,512,576

UNITED STATES PATENT OFFICE 2,512,576

REFRIGERATING METHOD AND APPARATUS

Joseph A. Cross, Westerville, Ohio, assignor to Mojonnier Bros. Co. Inc., Chicago, Ill., a corporation of Illinois Application October 29, 1947, Serial No. 782,926

12 Claims. (Cl. 62—115)

This invention relates in general to refrigerating apparatus and more particularly to apparatus designed especially to meet high peak refrigeration loads of short duration, without requiring the use of a compressor and condenser of a constant capacity equal to such peak loads.

While there are a number of known commercial uses for this invention it will suffice for present purposes to mention but two of them. One involves the quick cooling of milk. The other involves the cooling of air in such places, for example, as funeral chapels where cooling is usually required for only a few hours per day.

A particular need for an apparatus of this character is found in the cooling of milk either at the farm or at milk-receiving stations. At the farm, milk is produced twice a day at close to the blood temperature of the cows and in order to prevent undue growth of bacteria therein, the milk should be quickly cooled to a temperature range of 35° to 40° F. It is found that if the milk is quickly dropped, say within an hour's time, down to that range, the growth of bacteria, naturally present in the milk, does not have much time to progress and the milk thereafter stored at low temperature remains in excellent condition.

Another objective and advantage of quickly cooling the milk at the farm is to assist in retaining vitamin C, or ascorbic acid. Ascorbic acid usually breaks down rapidly in the presence of oxygen and heat equivalent to body heat. Milk is of course aerated in the process of milking and contains considerable oxygen in the dissolved air. The oxidation of the ascorbic acid will be minimized by rapid cooling to 35–40° F.

Also when milk is being transported from the individual dairy farm to the receiving station, even though it may have been properly cooled at the farm, it acquires considerable heat during warm weather enroute to the receiving station and is frequently received there at temperatures as high as 70° to 75° F. Usually, large quantities of milk arrive daily at the receiving stations within a space of a few hours, such as three or four hours, and should be quickly cooled to 35°–40° F. Therefore, the cooling equipment, either at the receiving station or at the farm has a peak load of short duration while during the remaining hours of the day there is little or no work for the cooling apparatus to perform, as frequently other refrigerated storage facilities are provided in which to place the cooled milk.

It is apparent that if the milk cooling load, either at the farm or the receiving station, were distributed evenly over a 24 hour day, the required maximum capacity of a refrigerant compressor used in the milk cooling equipment could be considerably less than under the foregoing described conditions.

This invention aims to provide cooling apparatus adapted for cooling large quantities of liquid in a short period of time with the aid of hold-over features provided in the system. In brief, this is accomplished by having the apparatus, during the off peak hours, store up refrigeration by freezing a considerable quantity of water or some other liquid whose freezing temperature and latent heat of fusion are suitable for the purposes of this invention. This ice is used during subsequent peak load periods to cool or to cool and condense the refrigerant, thus assuming part of the condensing or heat rejecting load which otherwise would be carried entirely by the mechanical condensing equipment. While the broad idea of hold-over refrigeration for use during peak loads has been applied heretofore in the cooling of milk and other products, all such prior systems of which I have knowledge differ in mode of operation and have limitations or disadvantages which render them inefficient or unsuitable for the peak load cooling of milk.

One general difference between the present invention and prior embodiments of the hold-over feature is that in the prior developments of this feature the material which is frozen, whether it be water, a solution of salts in water or some other suitable freezable liquid, is generally in static heat conducting contact with or is circulated in contact with the heat exchanger in which the milk or other product is to be cooled; whereas according to my invention the actual cooling of the product is done by direct vaporization of a refrigerant, the stored refrigeration being kept out of contact with the cooling product and being employed instead for cooling and condensing the refrigerant.

The general object of the present invention is to provide in a cooling system a storage unit in which a liquid such as water or a water solution is frozen during off peak load hours and the latent heat of fusion of the frozen water is used for extracting heat from the refrigerant during peak load periods.

Another object of the invention is to provide refrigeration apparatus for the cooling of milk or the like, which stores up refrigeration in a frozen body during off peak periods and is so arranged that the latent heat of fusion of the stored body is employed to act on the refrigerant to diminish the condensing load of the compressor system during peak load periods.

Another object of the invention is to provide in a variable load cooling system, means for providing hold-over refrigeration in which a refrigerant is used both for freezing and melting the freezable solution.

Another object of the invention is to provide, in a variable load cooling system, hold-over refrigeration in which a liquid frozen and melted by the refrigerant performs the bulk of the refrigeration during peak load cooling periods.

Other objects and advantages of the invention will be mentioned hereinafter or will become apparent from a perusal of the following specification.

On the drawings:

Figure 1 is a schematic showing of one embodiment of the invention;

Figure 2 is a schematic showing of another embodiment of my invention; and

Figure 3 is a schematic showing of an air cooler.

The form of the invention shown in Figure 1 will be explained as applied to the cooling of milk. The embodiment shown in Figure 1 includes a compressor 10, pipe line 11, through which the compressed refrigerant gas is delivered to a condenser 12, which preferably may be of ordinary design and cooled by water entering at the pipe 13 and exiting through the pipe 14. A receiver or surge tank 15 is employed to collect the condensed refrigerant and a pipe 16 delivers it to a vapor separating tank 17 under control of an expansion float controlled valve 18, which serves to maintain a predetermined level of liquid refrigerant in the tank 17.

During the off peak hours when no milk or other substance is to be quickly cooled in the cooler, the refrigerant, ammonia for example, is circulated in the low pressure side of the refrigeration system as follows. The liquid refrigerant flows from the tank 17 through the pipe 19, circulating pump 20, pipe 21, and through the coils 22 in the insulated tank 23, pipe 24, three-way valve 25 and pipe 26 into the vapor separator 17. The storage tank 23 is preferably heavily insulated and the coils 22 therein are entirely immersed in water. Preferably they will be provided with vertically extending metal fins 27 which will contribute to the efficiency and rapidity of both the freezing and the melting of the ice formed from the water or other freezable solution contained in the tank 23.

During the off peak periods the compressor 10 will operate and the heat acquired by the refrigerant while freezing the ice is rejected or discharged from the system at the condenser 12. Meanwhile the pump 20 circulates the refrigerant through the storage tank and this operation will continue until all of the liquid in the storage tank is frozen, at which time it is advisable to stop the compressor. This may be accomplished by providing a float 28 resting on the top of the liquid which upon being raised to a predetermined level will operate a switch 29 to cut off the current supply to the motor 30, thus to stop the compressor. Should any substantial melting of the ice occur during the off peak period the float controlled switch 29 will start the compressor.

During the freezing of the water in the tank 23, the refrigerant which becomes more or less vaporized by heat exchange with the water, is of course propelled by pump 20 into the vapor separator 17 along with any unvaporized refrigerant and the vapor is drawn to the compressor through the line 31.

Assuming that at the start of the operation of the compressor and the pump 20, all of the water in the storage tank may be in liquid condition and may have a temperature as high as 60 or 70°, even though the liquid refrigerant going into the tank 17 from the receiver 15 may have at that time a temperature in excess of the water temperature in the tank 23, the continued operation of the compressor will cause some of the liquid refrigerant in tank 17 to flash off, taking its heat from the remaining liquid in that tank, thus lowering the temperature of the refrigerant in tank 17 to a temperature substantially below that of the water in the tank 23. Thereafter, as the pump 20 circulates refrigerant through the storage tank there will be a temperature differential adequate to cause heat flow from the water on the outside of the coils 22 to the refrigerant on the inside of the coils, vaporizing the refrigerant. Continued operation of the system will gradually lower both the water and liquid refrigerant temperatures and soon the water will begin to freeze.

Shortly before all of the water in storage tank 23 has been frozen, the expansion of the water as it passes from the liquid into the solid state will cause the water level therein to rise sufficiently to operate the float control switch 29 and stop the compressor.

For cooling the milk it is preferred that a direct expansion cooler be employed and that the compressor be running during the milk cooling period. Hence, I have shown diagrammatically a cooler generally indicated at 32 having coils or channels 33 for carrying the refrigerant, a filling spout 34 whose shape is merely indicated diagrammatically, and an insulated collecting trough or tank 35 with a discharge valve 36. Preferably the coil or channel surfaces contacted by the milk are exposed or exposable for easy cleaning and the refrigerant flows inside the coils or channels. The inlet end of the refrigerant coil 33 is connected by means of a pipe 37 to the valve 25. While some automatic mechanism for operating this valve may be employed it is sufficient for the present purposes to indicate a hand operated three-way valve which if rotated to one position will direct the refrigerant to flow through the pipe 26 into the vapor separator 17, or if the valve be rotated to another position the refrigerant propelled by the pump 20 will flow through line 37 into the cooler. A pipe 38 will deliver the vaporized refrigerant or mixture of vaporized or unvaporized refrigerant from the milk cooler into the vapor separator 17. Preferably the coils 22 will be flooded with refrigerant and coils 33 nearly so.

No essential preference for any particular type of milk cooler is intended or indicated herein, the schematic showing being merely to indicate that the refrigerant is carried inside of pipes or channels, for the transfer of heat from the milk through pipe walls or channel walls into the refrigerant. Latent heat of vaporization of the refrigerant is derived from the milk, serving to cool the milk quickly.

Preferably, though not necessarily, the refrigerant circulating pump will deliver liquid refrigerant at such a rate that the milk cooler is unable to vaporize all of it, and the refrigerant discharged by the milk cooler will be part liquid and part gas.

During the operation of the milk cooler it is contemplated that the operator will have the compressor running so that refrigerant vapor will be withdrawn from the separator 17, compressed and recirculated back to the condenser 12, receiver 15, pipe 16 and again returned to the vapor separator 17, under the float controlled expansion valve 18.

If at the start of the milk cooling period the switch 29 is open, the operator can start the compressor by closing the switch 29', which latter switch should be reopened after the switch 29 closes.

While the milk is being cooled, the liquid refrigerant reaching the milk cooler first flows through the storage chamber 23 wherein, if it has not been cooled by flash evaporation in separator 17 to a temperature lower than the coil temperature in the storage tank it will during passage through the storage tank be cooled by the ice before entering the milk cooler. If the amount of vaporized refrigerant being delivered from the milk cooler into the separator 17 for a time exceeds the intake capacity of the compressor, the pressure and temperature in tank 17 will rise, but the liquid refrigerant being recirculated by the pump will be cooled by the ice-sheathed coils in tank 22, cooling all of the refrigerant being delivered to the milk cooler to a temperature not only lower than that of the milk, but low enough to cool the milk to about 35° F. or slightly thereabove. Therefore, in order to handle the peak loads and maintain a high cooling rate in the milk cooler throughout the entire demand therefor, it is necessary only to store in the freezing cabinet enough ice to supplement the heat rejecting capacity of the compressor and condenser during such peak load periods.

When the milk cooling period has been terminated, the operator will merely need to rotate the valve 25 to divert the flow of liquid refrigerant from the milk cooler directly through pipe 26 into the separator 17, and if most of the ice or all of the ice in tank 22 has been melted, the compressor will then take over the task of refreezing the water in the storage tank, having, however, the long off-peak period in which to do this.

The amount of heat added to the refrigerant from the milk during peak loads will of course be greater than the designed heat rejecting capacity of the mechanical condensing equipment, but this excess heat will be largely rejected into the ice in the storage tank. Hence, one may employ a mechanical compressor and condenser unit of capacity which is small relative to the heat load of the peak milk cooling period. As the cost of electric motors and compressors and the water demand of condensers increase greatly with increased compressor capacity, great savings in equipment and power installation costs may be achieved through the use of this invention.

No ice or ice-cooled water is stored in or circulates through the milk cooler, hence the cooler can be sterilized at any time without diminishing or interfering with the stored refrigeration.

If the temperature of the refrigerant entering the milk cooler be in the range of 27-32° F. and a reasonable amount of cooling surface be supplied, warm milk can easily be cooled to 35° F. To maintain such temperature conditions the water in the ice chest 23 may have a salt or other freezing point depressant added thereto.

If the system shown in Figure 1 be utilized for air cooling one need merely to substitute for the milk cooler 32 an air cooler 32' having finned coils 33' and connect the pipe 37 of Figure 1 to the pipe 37' of Figure 3 and the pipe 38 of Figure 1 to the pipe 38' of Figure 3.

With such a system, ice will be stored in the ice chest 23 during the off peak hours when no air cooling is required, but when it is required, the refrigerant delivered by the pump 20 will be caused to flow first through the ice chest and then through the coils 33' in the air cooler of Figure 3 and be delivered into the vapor separator 17. Accordingly, while air cooling greatly in excess of the rated capacity of the mechanical condensing equipment may be required for a few hours, the ice chest 23 will be able to absorb most of the heat added to the refrigerant during the air cooling period.

Referring now to Figure 2, a somewhat modified system is disclosed therein. The compressor 40 driven by a motor 41 will deliver the compressed refrigerant gas to a pipe line 42 into a condenser 43, which, if water cooled, will be cooled by water entering through the pipe 44 and exiting through the pipe 45. The condensed refrigerant will then be delivered into the refrigerant liquid receiver or surge tank 46 and will flow through pipe 47 into the vapor separator 48 under the control of a float-controlled expansion valve 49.

During the freezing of the water or aqueous solution in the storage tank during off peak periods, a pump 50 will draw liquid regrigerant from the vapor separator 48 through line 51, delivering it to line 52 and through a manually operated three-way valve 53 which is used to direct the refrigerant through pipe 54 and pipe 55 into a coil system 56 in the storage tank 57, there to freeeze the water or other liquid therein contained. Preferably vertical fins indicated as 58 will be secured to the refrigerant coil and the freezing of the liquid in the storage tank will eventually raise the float 59 and open a switch 60 to shut off the motor 41.

During the freezing of the liquid in the storage tank, vaporized and unvaporized refrigerant passing through the coils 56 is returned through the pipe 61 into the vapor separator 48. During this period the compressor is withdrawing refrigerant gas through the line 62, recompressing it and circulating it back to the condenser where its heat is rejected, and receiver to the vapor separator 48. Flash vaporization of some of the refrigerant in separator 48 is relied upon to lower the temperature of the liquid flowing out through the pipe 51 to a temperature below the temperature of the water or other liquid in the storage tank, to establish the necessary temperature differential to enable heat to flow from the water to the refrigerant, vaporizing the refrigerant and freezing the water.

During the milk cooling period the operator needs only to shift the valve 53 to deflect the liquid refrigerant away from the line 54 and into the line 63 from whence it flows through coils or other refrigerating channels 64 in the milk cooler 65 and emerges as refrigerant gas or part liquid and gas through a check valve 66 to lines 67 and 55 into the coils 56 in the storage tank, which at this time are surrounded by ice. During this operation the sensible and latent heat of the ice are relied upon to cool the unvaporized refrigerant now being delivered from the milk cooler and to wholly condense, or at least largely condense, dependent upon the load and the amount of ice present, the vaporized refrigerant being discharged from the milk cooler. Accordingly, during this heat exchange the ice is melted and the wholly or partially liquified refrigerant is returned from the lower end of coils 56 into the vapor separator 48.

The compressor of course should be running at full capacity at this time, and in the normal operation of the system the refrigerant delivered by the pipe 51 into the milk cooler will be at a lower temperature than the milk, to insure the necessary heat exchange.

Should the switch 60 be open at the start of the milk cooling period the operator may start the compressor by closing switch 60', which may remain closed until switch 60 closes as a result of the melting of the ice.

During the operation of the system shown in Figure 2, particularly during the early stages of the milk cooling period when there is ample ice in the storage tank 57 most, if not all, of the vaporized refrigerant discharged from the milk cooler will be recondensed in the storage tank 57. However, during that period and even during the later portions of the milk cooling period, as long as there is ice in the storage tank 57 a substantial heat load is relieved from the compressor and condenser equipment by the ice accumulation in the storage tank.

At the end of the milk cooling period, utilizing the system shown in Figure 2, the operator needs only to reverse the valve 53 to divert the refrigerant flow from the milk cooler directly back into the storage tank where freezing of the ice can be resumed. The automatic shut-off which operates to shut-off the compressor when a sufficient quantity of ice is frozen in the storage tank may be relied upon by the operator, not requiring his presence during the off peak period.

The refrigerant circulating pumps 20 and 50 may, if desired, be variable output pumps or may be driven by variable speed motors to enable the operator to regulate their output and the cooling by the refrigerant propelled thereby.

It will be noted that the water or other freezable liquid maintained in the storage tank is not circulated into contact with the heat exchange walls in the milk cooler, in contrast to some prior milk cooling devices wherein a body of water is frozen and the block of ice thus formed is utilized subsequently to cool water which is circulated through the heat exchange walls or passages of a milk cooler. The disadvantages of such systems need not be described here.

If it be desired to have a freezing temperature lower than 32° F. in the ice chest 57, it is necessary only to add a salt or some other freezing point depressant to the water therein.

Should one desire to use the system shown in Figure 2 for air cooling instead of milk cooling, it would be necessary only to substitute the air cooling unit diagrammatically shown in Figure 3 for the milk cooling unit shown in Figure 2, connecting pipe 63 of Figure 2 to pipe 37' of Figure 3 and pipe 38' of Figure 3 to pipe 67 of Figure 2.

It should also be evident that systems made in accordance with the present invention preferably should be designed for specific installations wherein the amount and duration of the heat load during any 24 hour period is known in advance. With such information in hand the capacity of the refrigeration equipment and the capacity of the ice storage compartment may be calculated and designed in accordance with this invention to satisfy the requirements of the particular installation with the minimum investment in equipment.

It will be understood that the invention is susceptible of variation through a wide range differing from the above disclosure, without departing from the principles or scope of the invention as defined in the appended claims.

I claim as my invention:

1. A method of storing and utilizing refrigeration, comprising circulating refrigerant in the low pressure side of a refrigeration system through coils in a water containing chamber thereby freezing the water to ice therein during periods of low refrigeration demand, and during periods of high refrigeration demand circulating the refrigerant on the low pressure side of the system in series through a direct expansion cooler and the coils in said chamber thereby rejecting to the ice the greater portion of the heat acquired by the refrigerant in its passing through said cooler.

2. A method of storing and utilizing refrigeration, comprising circulating refrigerant in the low pressure side of a refrigeration system through coils in a water containing chamber for freezing ice therein during periods of low refrigeration demand, compressing the refrigerant vaporized during the freezing of the ice and liquifying the compressed refrigerant while rejecting its heat through a condenser, and during periods of high refrigeration demand circulating the refrigerant on the low pressure side of the system in series through a direct expansion cooler and the coils in said chamber for rejecting to the ice in said chamber the greater portion of the heat acquired by the refrigerant in passage through the cooler.

3. A method of storing and utilizing refrigeration comprising circulating refrigerant in the low pressure side of a refrigeration system through refrigerant ducts in a water containing chamber for freezing ice therein during periods of low refrigeration demand, compressing the refrigerant vaporized during said freezing and rejecting the heat therefrom through a condenser on the high pressure side of the system, and during periods of high refrigeration demand, circulating the refrigerant on the low pressure side of the system through a direct expansion cooler and the ice-sheathed ducts in said chamber for rejecting into the ice the greater portion of the heat acquired by the refrigerant in its passage through the cooler.

4. A method of storing and utilizing refrigeration comprising circulating refrigerant from a vapor separator in the low pressure side of a refrigeration system through refrigerant ducts in a water containing chamber for freezing ice therein during periods of low refrigeration demand, compressing the refrigerant vaporized during said freezing and rejecting the heat therefrom through a condenser on the high pressure side of the system, delivering condensed refrigerant from the condenser through a liquid level fluid controlled valve into the vapor separator, and during periods of high refrigeration demand circulating the refrigerant on the low pressure side of the system from the vapor separator through a direct expansion cooler and the ice-sheathed ducts in said chamber and back again to said separator for rejecting into the ice the greater portion of the heat acquired by the refrigerant in its passage through the cooler.

5. A method of storing and utilizing refrigeration comprising circulating refrigerant in the low pressure side of a refrigeration system through coils in a water containing chamber for freezing ice therein during periods of low refrigeration demand, and during periods of high refrigeration demand circulating the refrigerant on the low pressure side of the system in series through a direct expansion cooler and the coils in said water containing chamber for effecting cooling and condensing of refrigerant heated and evaporated in the cooler.

6. A cooling system comprising a compressor, a condenser, a refrigerant vapor separator, an ice chest having refrigerant coils immersed in a body of water with said coils in series with a refrigerant flow circuit beginning and ending at the separator, a pump for positively circulating refrigerant from said separator through said coils and back to the separator, a direct expansion cooler, and means for selectively causing the liquid refrigerant delivered by said pump to flow through said cooler in series with the coils in said ice chest or through said coils alone.

7. A fluid cooling system comprising a compressor, a condenser, a vapor separator in communication with said condenser, a liquid level controlled valve for regulating communication between the condenser and separator, a cooler for the fluid having refrigerant evaporation duct means, a storage chamber for a freezable liquid, refrigerant duct means in said chamber positioned for immersion in said liquid, and duct means including a valve for selectively circulating refrigerant in the low pressure side of the system from said separator through said duct means in the chamber and back to said separator for freezing the liquid in the chamber or for circulating the refrigerant in the low pressure side of the system in a circuit beginning at the separator through the fluid cooler and said refrigerant ducts in said chamber and back to said separator for transferring heat from the fluid in the cooler to the refrigerant and discharging heat from the refrigerant to the frozen liquid in said storage chamber.

8. A cooling system comprising a compressor, a condenser, a refrigerant vapor separator, conduit means connecting the separator with the compressor and with the condenser, an ice chest having refrigerant coils immersed in a body of water therein, a direct expansion cooler and means including pipes and a pump for selectively circulating refrigerant from the separator through said coils and back again to said separator, or circulating the refrigerant delivered by said pump through said cooler in series with the coils in said ice chest.

9. A cooling system comprising a heat exchanger for the cooling of a fluid, a compressor and condenser, a water containing refrigeration storage chamber having refrigerant coils immersed therein, a refrigerant gas and liquid separator, and means for selectively circulating liquefied refrigerant on the low pressure side of the system through said coils for freezing water in said chamber and concurrently compressing and condensing the refrigerant vaporized in said chamber, or for circulating the refrigerant through the heat exchanger and said coils.

10. A fluid cooling system comprising a compressor, a condenser, a vapor separator, an expansion valve controlling the flow of condensed refrigerant into the separator, a cooler for the fluid having refrigerant evaporation duct means, a storage compartment, a refrigerant coil in said compartment positioned for immersion in a freezable liquid, and means including connections for selectively circulating refrigerant in the low pressure side of the system from said separator through said refrigerant coil and back to said separator for freezing said freezable liquid or from the separator through both the fluid cooler and said refrigerant coil and back to said separator for simultaneously transferring heat from the fluid in the cooler to the refrigerant and discharging heat from the refrigerant to the frozen liquid in said storage compartment.

11. A refrigerating system for storing and utilizing refrigeration comprising a compressor, a condenser, a surge drum connected for receiving liquid refrigerant from the condenser, a vapor separator and a float controlled valve connected for admitting liquid refrigerant from said drum to said separator, an ice chest having refrigerant ducts positioned for immersion in water therein, a fluid cooler having refrigerant ducts therein, and means including a pump for selectively circulating refrigerant in the low pressure side of the system from the separator through the ice chest and back to said separator for freezing water in the ice chest or for circulating the refrigerant from the separator through both the cooler and ice chest for rejecting into the ice in the ice chest heat acquired by the refrigerant in passage through the cooler.

12. A method of storing and utilizing refrigeration comprising circulating refrigerant in the low pressure side of a refrigeration system through coils in a water containing chamber for freezing ice therein during periods of low refrigeration demand, and during periods of high refrigeration demand circulating the refrigerant on the low pressure side of the system both through said coils and through a direct expansion cooler thereby transferring to the ice a portion of the heat acquired by the refrigerant in its passage through said cooler.

JOSEPH A. CROSS.

REFERENCES CITED

The following references are of record in the file of this patent:

UNITED STATES PATENTS

| Number | Name | Date |
|---|---|---|
| 2,056,786 | Harbordt | Oct. 6, 1936 |
| 2,076,809 | Candor | Apr. 13, 1937 |